(12) United States Patent
Tetenes

(10) Patent No.: US 7,249,435 B1
(45) Date of Patent: Jul. 31, 2007

(54) DEVICE FOR HOLDING A BUCKET OF FROZEN CHUM

(76) Inventor: John L. Tetenes, 1355 Akron St., Copiague, NY (US) 11726

(\*) Notice: Subject to any disclaimer, the term of this patent is extended or adjusted under 35 U.S.C. 154(b) by 0 days.

(21) Appl. No.: 10/027,358

(22) Filed: Dec. 26, 2001

(51) Int. Cl.
*A01K 97/02* (2006.01)
*A01K 97/04* (2006.01)

(52) U.S. Cl. .............................. 43/44.99; 43/55; 43/56
(58) Field of Classification Search ............. 43/44.99, 43/54.1, 55, 56, 44.2, 42.06; 220/560
See application file for complete search history.

(56) References Cited

U.S. PATENT DOCUMENTS

| | | | | |
|---|---|---|---|---|
| 1,841,956 A | * | 1/1932 | Juergens | 43/55 |
| 2,241,314 A | | 5/1941 | Mohler | 43/55 |
| 2,253,688 A | * | 8/1941 | Collins | 43/55 |
| 2,377,311 A | * | 6/1945 | Campbell | 383/121.1 |
| 2,580,879 A | | 1/1952 | Belokin, Jr. | 150/48 |
| 2,600,826 A | | 1/1952 | Allen | 43/56 |
| 2,603,028 A | * | 7/1952 | Roberts | 43/55 |
| 2,941,327 A | * | 6/1960 | Rundell | 43/44.99 |
| 3,478,463 A | * | 11/1969 | Ruter | 43/55 |
| 3,499,526 A | | 3/1970 | Willinger | 206/47 |
| 3,717,124 A | | 2/1973 | Jacobs | 119/3 |
| 3,919,803 A | * | 11/1975 | Manguso | 43/55 |
| 3,974,591 A | | 8/1976 | Ray | 43/43.14 |
| 4,570,374 A | | 2/1986 | Baxley | 43/55 |
| 4,638,588 A | * | 1/1987 | Abadie | 43/44.99 |
| 4,829,705 A | * | 5/1989 | Dorsey | 43/44.99 |
| 4,890,413 A | * | 1/1990 | Nelson et al. | 43/55 |
| 4,903,429 A | | 2/1990 | Tetenes | 43/44.99 |
| 5,617,669 A | * | 4/1997 | Levey | 43/44.99 |

FOREIGN PATENT DOCUMENTS

GB        2123261        *  2/1984

\* cited by examiner

*Primary Examiner*—David Parsley
(74) *Attorney, Agent, or Firm*—Richard L. Miller

(57) ABSTRACT

A device for holding a bucket of frozen chum is fabricated primarily out of flexible plastic material that is integrally formed with a toroidal sleeve there around. The toroidal sleeve has a plastic foam floatation element housed therein, so that a frozen bucket of chum that is installed and contained in a cylindrical component of the device is maintained at a right distance below the surface of a body of water in which the device has been deployed. A plurality of holes are provided in components of the device, so that chum matter can pass there through as the frozen chum melts and exits the device into the surrounding body of water to attract fish. The device is also provided with a drawstring that cooperates with an upper edge of the cylindrical containing component to captivate the frozen bucket of chum therein.

2 Claims, 1 Drawing Sheet

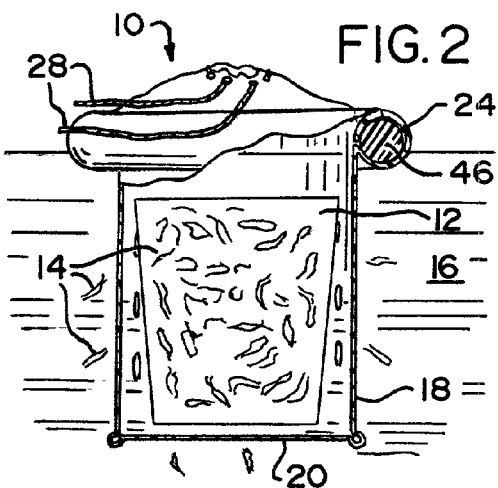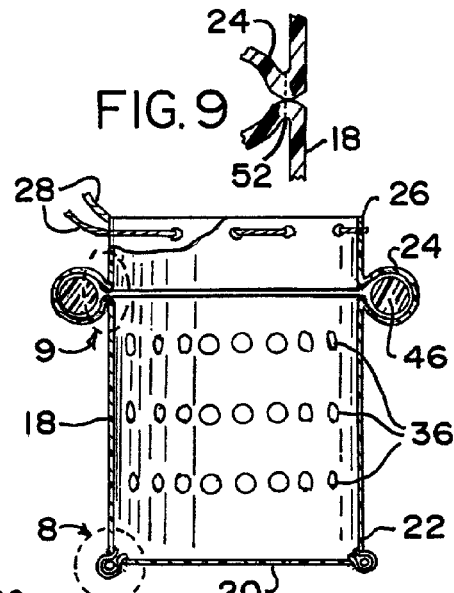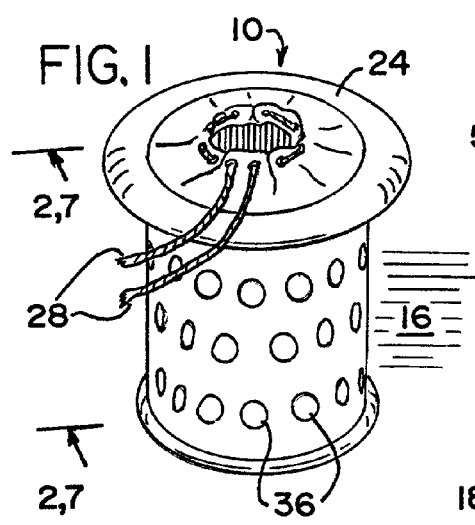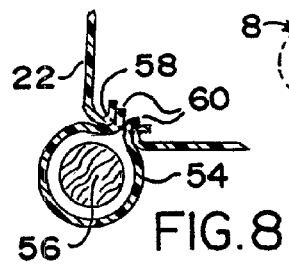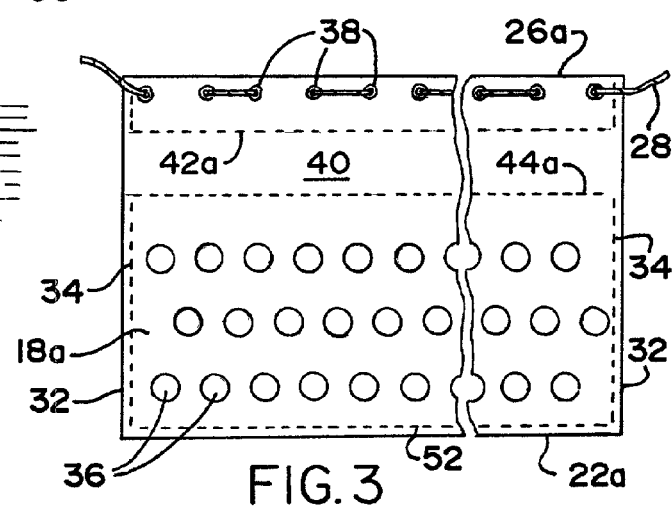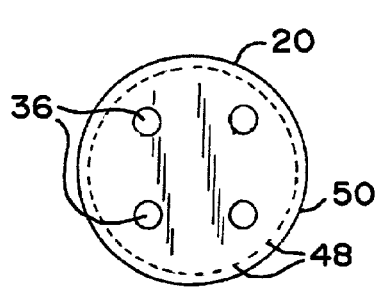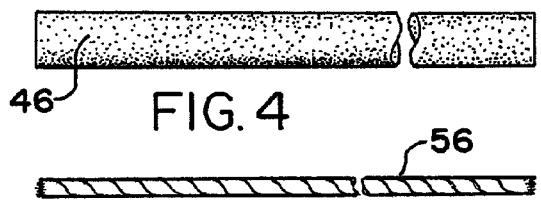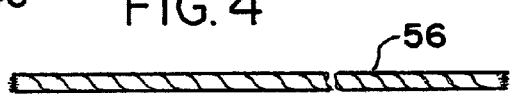

DEVICE FOR HOLDING A BUCKET OF FROZEN CHUM

BACKGROUND OF THE INVENTION

1. Field of the Invention

The present invention relates to devices to attract fish.

2. Description of the Prior Art

Numerous innovations for devices and apparatuses to attract fish have been provided in the prior art that will be described. Even though these innovations may be suitable for the specific individual purposes to which they address, however, they differ from the present invention.

A FIRST EXAMPLE, U.S. Pat. No. 2,241,314 to Mohler teaches in a device of the character described, a circular pneumatic float of resilient material, a sack of netting depending from the bottom of the float, and having a mouth extending around the bottom of the float and detachably secured to the latter, and a tethering line attached to said float for anchoring the same, said float having a diametrical slit therein forming an inlet into said sack.

A SECOND EXAMPLE, U.S. Pat. No. 2,580,879 to Belokin, Jr. teaches a collapsible bucket which comprises a foldable, collapsible tubular side portion, a foldable circular bottom portion disposed at one end of said side portion, means for joining said side portion and said bottom in liquid-tight engagement, a collapsible annular, tubular air chamber disposed at the other end of said side portion, the outermost point of said chamber being secured to the inner surface of said side portion, valve means for inflating and deflating said chamber and foldable handle means attached to said side portion.

A THIRD EXAMPLE, U.S. Pat. No. 2,600,826 to Allen teaches a bait container comprising a cylindrical shell having perforations adjacent it upper end; a continuous angle member surrounding said shell and having first and second flanges attached to said shell to form an air chamber, a closure for the upper end of said shell, a receptacle slidably received in said shell, a pair of arms rising from said receptacle, said closure having a pair of openings slidably receiving said arms, and a carrying ball attached to said arms and overlying said closure, said shell being imperforate below said angle member.

A FOURTH EXAMPLE, U.S. Pat. No. 3,499,526 to Willinger teaches this invention is directed to providing a novel fish feeder combination in which the fish food, the food dispenser and instructions therefore are all held in a single storage container. The fish food, preferably freeze dried Tubifex worms, is stored in the lower portion of the two-part container while the food dispenser or feeder and the instructive material describing the use of the novel combination are stored in the upper portion.

A FIFTH EXAMPLE, U.S. Pat. No. 3,717,124 to Jacobs teaches a fish culture cage assembly which includes an annular float ring having a radially inwardly extending flange thereon. The assembly also includes a foraminous, generally cylindrical cage structure, having an open upper end and a closed lower end, detachably depending from said flange, and a lid detachably secured to said float ring and covering the open top of said cage structure. A cylindrical feeding ring may be detachable suspended from projections inside the foraminous cage in the upper portion thereof. The feed ring has a plurality of openings which are substantially smaller than the openings through the cage, the feed ring being open at its upper and lower ends.

A SIXTH EXAMPLE, U.S. Pat. No. 3,974,591 to Ray teaches a perforated chum holder and dispenser is formed in two hingedly connected half sections having snap locking means, whereby the device may be closed around either a fishing line float for top fishing or a line sinker for bottom fishing. The opposite ends of the device are grooved to receive a fishing line or leader with a coacting locking element.

A SEVENTH EXAMPLE, U.S. Pat. No. 4,570,374 to Baxley teaches a floating fish receptacle for retaining caught fish in a live condition under water includes a molded foam, generally cylindrical housing member which includes as part thereof in unitary construction a floatation collar outwardly extending from the outside diameter surface and a pair of baffle members inwardly extending from the inside surface. The baffle members are arranged in an axially (vertically) separated relationship and are radially spaced 180 degrees apart so as to create a zig zag slide action for fish which are dropped through the top opening of the housing. As the fish enters, it strikes one downwardly and inwardly inclined surface of one baffle member and then is transferred to the corresponding surface of the other baffle member and then on through to a mesh bag which is suspended therebelow for retention of the fish. The top opening of the housing is above the water level while the opposite and lower opening of the housing member is below the water level. The mesh bag is secured around this lower opening so as to insure that the mesh bag is below water at all times that fish are stored therein. The baffle members are removable form the main housing as is the mesh bag. Consequently, the main housing member may be used in combination with the mesh bag without the baffle members and the mesh bag may be used independently of the housing member.

AN EIGHTH EXAMPLE, U.S. Pat. No. 4,903,429 to Tetenes teaches a device to attract fish is provided and consists of a bucket held within a net suspended downwardly from a float into a body of water. The bucket holds frozen fish chum so that open top of the bucket is at right distance below water allowing pieces of defrosted fish chum to be dispensed from the bucket and float on the water to attract the fish.

SUMMARY OF THE INVENTION

AN OBJECT of the present invention is to provide a device for holding a bucket of frozen chum that avoids the disadvantages of the prior art.

ANOTHER OBJECT of the present invention is to provide a device for holding a bucket of frozen chum that is simple and inexpensive to manufacture.

STILL ANOTHER OBJECT of the present invention is to provide a device for holding a bucket of frozen chum that is simple to use.

BRIEFLY STATED, STILL YET ANOTHER OBJECT of the present invention is to provide a device for holding a bucket of frozen chum that is fabricated primarily out of flexible plastic material which is integrally formed with a toroidal sleeve there around, having a plastic foam flotation element housed therein, so that a frozen bucket of chum installed and contained in a cylindrical component of the device is maintained at a right distance with respect to the surface of a body of water in which the device has been deployed.

A plurality of holes are provided in components of the device so that chum matter can pass therethrough as the frozen chum melts and exits the device into the surrounding body of water so as to attract fish. The device is also provided with a drawstring which cooperates with an upper edge mechanism of the cylindrical containing component of the device so as to captivate the frozen bucket of chum therein.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows:

FIG. 1 is a diagrammatic perspective view of the present invention per se;

FIG. 2 is a diagrammatic side elevational view, partially in section taken on line 2-2, with parts broken away, illustrating the construction thereof;

FIG. 3 is an elevational plan view of the pattern which forms the cylindrical containing component of the present invention;

FIG. 4 is an elevational view of the foam flotation device which is utilized in the construction thereof;

FIG. 5 is an elevational view of the rope insert which is utilized in the construction of the welt at the lower edge of the cylindrical containing component of the present invention;

FIG. 6 is an elevational plan view of the pattern which forms the circular bottom component of the present invention;

FIG. 7 is a diagrammatic cross sectional view of the present invention per se, taken on line 7-7, before captivating any chum bucket therein;

FIG. 8 is an enlarged diagrammatic cross sectional view of the area enclosed in the dotted curve indicated by arrow 8 in FIG. 7; and FIG. 9 is an enlarged diagrammatic cross sectional view of the area enclosed in the dotted curve indicated by arrow 9 in FIG. 7.

A MARSHALLING OF REFERENCE NUMERALS UTILIZED IN THE DRAWING 10 device for holding a bucket 12 of frozen chum 14
12 bucket
14 frozen chum
16 body of water
18 cylindrical containing component
18a rectangular sheet of material
20 circular bottom component
22 lower edge of the cylindrical containing component 18
22a lower edge
24 toroidal sleeve
26 upper edge of the cylindrical containing component 18
26a upper edge
28 drawstring
32 two side edges
34 appropriate thread indicated by the stitching lines
36 first plurality of orifices
38 second plurality of orifices in-line
40 longitudinal area
42a first longitudinal edge
44a second longitudinal edge
46 foam flotation element
48 stitching, indicated by dotted circle
50 circumference
52 dotted line for stitching on rectangular sheet of material 18a near the lower edge 22
54 welting
56 rope component
58 stitching
60 edges of welting 54

DETAILED DESCRIPTION OF THE PREFERRED EMBODIMENT

Referring now to the figures, in which like numerals indicate like parts, and particularly to FIGS. 1 and 2, which shows views of the device 10 for holding a bucket 12 of frozen chum 14 submerged in a body of water 16. The device 10, has a cylindrical containing component 18, with a circular bottom component 20 permanently attached to a lower edge 22 of the cylindrical containing component 18. A toroidal sleeve 24 is fixedly located near an upper edge 26 of the cylindrical containing component 18. A drawstring 28 cooperating with the upper edge 26 of the cylindrical containing component 18, is provided for pulling the upper edge closed and captivating the bucket 12 of chum 14 held within the device 10.

As best seen in FIG. 3, the cylindrical containing component 18 is fabricated out of a rectangular sheet of material 18a, wherein the rectangular sheet of material 18a has an upper edge 26a, a lower edge 22a and two side edges 32. It is to be noted that the upper edge 26a of the rectangular sheet of material 18a becomes the upper edge 26 of the cylindrical containing component 18, and the lower edge 22a of the rectangular sheet of material 18a becomes the lower edge 22 of the cylindrical containing component 18 when the cylinder containing component is formed. In fabricating the cylindrical containing component 18 the rectangular sheet of material 18a has the two side edges 32 stitched together with appropriate thread indicated by the stitching lines 34. The rectangular sheet of material 18a has a first plurality of orifices 36 therein for permitting chum matter to pass through and a second plurality of orifices 38 in-line therein for cooperating with the drawstring 28 threaded therethrough. The rectangular sheet of material 18a has a longitudinal area 40 extending between the first plurality of orifices 36, and the second plurality of orifices 38 in-line, for fabricating the toroidal sleeve 24.

The toroidal sleeve 24 is fabricated by stitching 52, along a first longitudinal edge indicated as 42a of the longitudinal area 40 and along a second longitudinal edge indicated as 44a of the longitudinal area 40, together. The toroidal sleeve 24 has a foam flotation element 46 inserted therein and is accordingly so housed within the sleeve 24.

As best seen in FIG. 6, circular bottom component is fabricated out of sheet material having typically four orifices 36 therein for permitting chum matter to pass therethrough and is permanently attached by stitching, indicated by both dotted circle 48, near a circumference 50 thereof, and dotted line for stitching 52 on rectangular sheet of material 18a near the lower edge 22 of the cylindrical containing component 18.

As best seen in FIG. 8, in order to impart a minimum amount of rigidity to the device 10, a welting 54, having a rope component 56 captivated therein, has edges 60 sewn, with stitching 58, by accordingly inserting the edges 60 prior to sewing, in between the circumference of the circular bottom component and the lower edge of the cylindrical containing component.

It is to be noted that there are many materials which would be suitable to utilize for the sheet material when fabricating the device 10, and while it is not to be construed that plastic is the only suitable material certainly such would be an appropriate choice. It is also to be realized that while the word stitching has been continuously used through out this disclosure as the mechanism for securing components together that this should be broadly interpreted to include various other securement processes, namely to mention just two, such as heatsealing and riveting. Accordingly it is not the intent to limit the scope of this disclosure to any particular means of joining components together.

It will be understood that each of the elements described above, or two or more together, may also find a useful application in other types of constructions differing from the types described above.

While the invention has been illustrated and described as embodiments of a device for holding a bucket 12 of frozen chum, however, it is not limited to the details shown, since it will be understood that various omissions, modifications, substitutions and changes in the forms details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A device for holding a bucket of chum submerged in water, comprising:
   a) a cylindrical containing component having a lower edge and an upper edge;
   b) a circular bottom component being permanently attached to said lower edge of said cylindrical containing component;
   c) a toroidal sleeve being fixedly located near said upper edge of said cylindrical containing component;
   d) a drawstring cooperating with said upper edge of said cylindrical containing component and pulling said upper edge closed for captivating the bucket of chum held within said device; and
   e) a welting having edges;
   wherein said cylindrical containing component is fabricated out of sheet material;
   wherein said sheet material is rectangular and has an upper edge, a lower edge, and two side edges;
   wherein said upper edge of said sheet material is said upper edge of said cylindrical containing component;
   wherein said lower edge of said sheet material is said lower edge of said cylindrical containing component;
   wherein said sheet material has two side edges that are stitched together;
   wherein said sheet material has a first plurality of orifices therein for permitting chum matter to passthrough;
   wherein said sheet material has a second plurality of orifices inline therein for cooperating with said drawstring that is threaded therethrough;
   wherein said sheet material has a longitudinal area extending between said first plurality of orifices and said second plurality of orifices, that fabricates said toroidal sleeve, and has a first longitudinal edge and a second longitudinal edge;
   wherein said toroidal sleeve is fabricated by attaching said first longitudinal edge of said longitudinal area and said second longitudinal edge of said longitudinal area together;
   wherein said sheet material is flexible plastic material;
   wherein said circular bottom component is fabricated out of a second sheet material having at least one orifice therein for permitting the chum matter to pass through;
   wherein said circular bottom component has a circumference and is permanently attached by stitching near said circumference thereof and near said lower edge of said cylindrical containing component;
   wherein said edges of said welting are sewn in between said circumference of said circular bottom component and said lower edge of said cylindrical containing component; and
   wherein said second sheet material is flexible plastic material.

2. The device as defined in claim 1, wherein said toroidal sleeve has foam floatation element housed therein.

* * * * *